United States Patent [19]
Gire

[11] Patent Number: 5,476,139
[45] Date of Patent: Dec. 19, 1995

[54] HEAT EXCHANGE AND FILTER UNIT

[75] Inventor: Hélène Gire, Asnieres, France

[73] Assignee: Valeo Thermique Moteur, Le Mesnil-Saint-Denis, France

[21] Appl. No.: 262,279

[22] Filed: Jun. 20, 1994

[30] Foreign Application Priority Data

Jun. 23, 1993 [FR] France ................................. 93 07653

[51] Int. Cl.$^6$ ................................................. B01D 35/18
[52] U.S. Cl. .......................... 165/119; 165/916; 210/184; 210/186
[58] Field of Search ..................... 165/119, 916; 210/184, 186

[56] References Cited

U.S. PATENT DOCUMENTS

| | | | |
|---|---|---|---|
| 1,900,821 | 3/1933 | Kline | 210/186 X |
| 2,730,083 | 1/1956 | Kremser . | |
| 4,878,536 | 11/1989 | Senlund . | |
| 5,326,461 | 7/1994 | Legrand | 210/186 |

FOREIGN PATENT DOCUMENTS

| | | |
|---|---|---|
| 0344206 | 12/1989 | European Pat. Off. . |
| 0547950 | 6/1993 | European Pat. Off. . |
| 1551472 | 8/1970 | Germany . |
| 1551451 | 12/1970 | Germany . |
| 2361515 | 6/1975 | Germany . |
| 3317008 | 11/1984 | Germany . |
| 0320279 | 8/1929 | United Kingdom . |
| 8806228 | 8/1988 | WIPO . |

*Primary Examiner*—Allen J. Flanigan
*Attorney, Agent, or Firm*—Morgan & Finnegan

[57] ABSTRACT

A heat exchanger, especially for the purpose of cooling and filtering motor vehicle engine lubricating oil, has a filter integrated into it, to form a unit which comprises a casing having an outer cylindrical wall symmetrical about an axis, a first end wall and a second end wall. A filter cartridge is contained in a filter compartment within the casing. A first fluid such as engine oil enters a first chamber from whence it passes to the filter compartment. Oil flowing in this first compartment is cooled by heat exchange with a second fluid flowing in a second chamber. The casing contains a cylindrical partition wall extending from the first end wall to the vicinity of the second end wall, to define a communication passage from the first chamber to the filter compartment. Both the first and second chambers are part of a heat exchange compartment containing heat exchange means which separate the two chambers. The first fluid cannot reach the filter until it has passed through the heat exchange means.

4 Claims, 4 Drawing Sheets

HEAT EXCHANGE AND FILTER UNIT

FIELD OF THE INVENTION

This invention relates to heat exchanger and filter units, that is to say a heat exchanger unit which has a filter integrated with it; Such a unit is especially, though not exclusively, applicable to the cooling and filtering of lubricating oil of a heat engine for a motor vehicle.

BACKGROUND OF THE INVENTION

A heat exchanger of this type is known from European published patent specification EP 0 344 206A, which discloses a heat exchanger with an integrated filter, comprising:

a casing delimited by a cylindrical wall which is symmetrical about an axis; a first end wall; and a second end wall, a filter compartment disposed in an axial region of the casing and containing a tubular filter cartridge, a heat exchange compartment of annular configuration, disposed between the filter compartment and the cylindrical wall of the casing, heat exchanger means disposed in the heat exchange compartment so as to define therein a first chamber for flow of a first fluid and a second chamber for flow of a second fluid, and in which the first chamber communicates firstly with a first inlet for the said first fluid, and secondly with the filter compartment, which is in communication with a first outlet for the first fluid, the said first inlet and first outlet being arranged on the first end wall of the casing, while the second flow chamber communicates with a second inlet and a second outlet for the said second fluid, the said second inlet and outlet being arranged on the said cylindrical wall of the casing. Such a heat exchanger will be referred to herein as a heat exchanger of the kind specified.

In the case where such a heat exchanger is used for cooling and filtering the lubricating oil of a heat engine, this oil constitutes the first fluid. The second fluid is then typically the engine coolant, usually comprising water to which anti-freeze has been added.

In the above known type of heat exchanger, the heat exchange means consist of a simple cylindrical separating wall which divides the heat exchange compartment so as to define within the latter the said first and second chambers. The first chamber is disposed between the cylindrical separating wall and the filter compartment, while the second chamber is defined between the cylindrical separating wall and the cylindrical outer wall of the casing.

In addition, the first chamber is separated from the filter compartment by a perforated wall which has a multiplicity of perforations distributed over its whole periphery and over its whole depth. These perforations are such that the first fluid, after having been cooled by heat exchange with the second fluid, passes through the perforations so as to reach the filter compartment, in which it is filtered by passing through the tubular filter cartridge. The first fluid passes radially through this tubular cartridge, and is collected in a central duct which is connected to the first fluid outlet arranged on the first end wall of the casing.

Such a heat exchanger, as described above, has various disadvantages. Firstly, it is found that some of the first fluid penetrating into the first chamber has a tendency to pass directly through the perforations of the perforated wall, which lie close to the first inlet of the casing, without having undergone heat exchange with the second fluid. Thus, in the case where the first fluid is lubricating oil which ought to be both cooled and filtered, there is always some part of this oil which is filtered without having previously been cooled.

Another disadvantage of the above known type of heat exchanger lies in the fact that the heat exchange means comprise a simple cylindrical wall which, consequently, offers a minimal heat exchange surface. As a result, the heat exchanger as described in the above mentioned European patent specification is very limited as to its heat exchange performance, and is unable to offer optimal cooling to the first fluid, especially when the latter is engine lubricating oil.

DISCUSSION OF THE INVENTION

A major object of the present invention is to overcome the above mentioned drawbacks.

According to the invention, a heat exchanger of the kind specified is characterised in that the heat exchanger further includes a cylindrical partition wall extending from the first end wall to the vicinity of the second end wall, so as to separate the said first chamber in the heat exchange compartment from the filter compartment, whereby to define between the said first chamber and the said filter compartment a communication passage for the said first fluid, the communication passage being disposed in the vicinity of the second end wall.

With this arrangement, by contrast with the heat exchanger and filter unit described in the European patent specification mentioned above, the first fluid is unable to reach the filter compartment directly. It can only reach that compartment after having undergone heat exchange with the second fluid.

In this connection, in order to reach the filter compartment the first fluid is obliged to flow in the axial direction of the heat exchanger, from the first inlet which is arranged on the first end wall, to the communication passage which lies close to the second end wall, which is of course at the opposite end of the first inlet through which it entered the casing. Over the whole of its path to the communication passage, the first fluid is in thermal contact with the second fluid through the heat exchange means disposed in the heat exchange compartment. As a result, all of the first fluid is cooled before reaching the filter compartment, in which it is then filtered by the filter cartridge.

According to a preferred feature of the invention, the filter cartridge is disposed coaxially within the cylindrical partition wall, and is spaced away from the latter so as to define between them an annular passage for flow of the said first fluid received therein from the first chamber of the heat exchange compartment via the communication passage, and whereby the first fluid can then pass from the said annular passage radially through the tubular filter cartridge.

Due to the fact that the annular passage extends over the whole periphery of the filter cartridge, access to the latter by the first fluid is maximised.

Instead of making use of a simple cylindrical wall for separating the said first and second chambers from each other, the invention provides various embodiments of heat exchange means which have the effect of optimising the heat exchange between the first and second fluids.

In a first embodiment of the invention, the heat exchange means comprise a pleated surface of tubular configuration, comprising a multiplicity of pleats extending radially with respect to the axis of the casing, and the said first chamber is defined between the said pleated surface and the cylindrical partition wall, while the said second chamber is defined between the said pleated surface and the cylindrical wall of the casing. In this embodiment, the pleats are joined in pairs, alternately on the inner radial side and the outer radial side, through rounded bends, and each said pleat has pressed out portions defining bosses, in order to increase the heat exchange surface available.

In a second embodiment of the invention, the heat exchange means comprise a pleated surface of generally tubular configuration having a multiplicity of annular pleats extending in planes substantially at right angles to the axis of the casing, and surrounding the latter, and the said first chamber is defined between the said pleated surface and the cylindrical partition wall, while the said second chamber is defined between the said pleated surface and the cylindrical wall of the casing.

In a third embodiment of the invention, the heat exchange means comprise two concentric cylindrical envelopes joined together by perturbating elements for generating turbulence, and the said first chamber is defined between the two said cylindrical envelopes and is connected to the said communication passage, while the said second chamber occupies an annular volume which is delimited by the cylindrical wall of the casing and by the cylindrical partition wall, the second chamber extending on either side of the said two envelopes.

Thus, in these first three embodiments, the second fluid is always in contact with the cylindrical wall of the casing.

In a fourth embodiment of the invention, the heat exchange means comprise a multiplicity of bent, flat tubes extending around the axis of the casing, each said flat tube being connected to an inlet collector tube and to an outlet collector tube, the said collector tubes extending parallel to the axis of the casing and being connected to the inlet and the outlet, respectively, for the said second fluid, the said first chamber is delimited by the cylindrical wall of the casing and by the cylindrical partition wall, and the said second chamber is delimited by all of the said flat tubes and by the inlet and outlet collector tubes.

In a fifth embodiment of the invention, the heat exchange means comprise a multiplicity of round hairpin tubes, which are curved and joined together through radial fins, and the said first chamber is defined between the cylindrical wall of the casing and the internal partition wall, while the said second chamber is defined by all of the hairpin tubes.

In a sixth embodiment of the invention, the heat exchange means comprise a multiplicity of round tubes extending parallel to the axis of the casing and equidistantly from the latter, with a multiplicity of annular fins joining the round tubes, together with a toroidal inlet collector and a toroidal outlet collector which are connected respectively to the inlet and the outlet for the said second fluid, and the said first chamber is defined between the cylindrical wall of the casing and the cylindrical partition wall, while the said second chamber is defined by all of the round tubes together with the inlet collector and the outlet collector.

Thus, in these last three embodiments, the first fluid makes contact with the cylindrical wall of the casing.

According to a further preferred feature of the invention, a cover plate is mounted removably on the second end wall of the casing for the replacement of the tubular filter cartridge.

Various preferred embodiments of the invention will be described below, by way of example only and with reference to the accompanying drawings.

DESCRIPTION OF PREFERRED
EMBODIMENTS OF THE INVENTION

Figure 1:
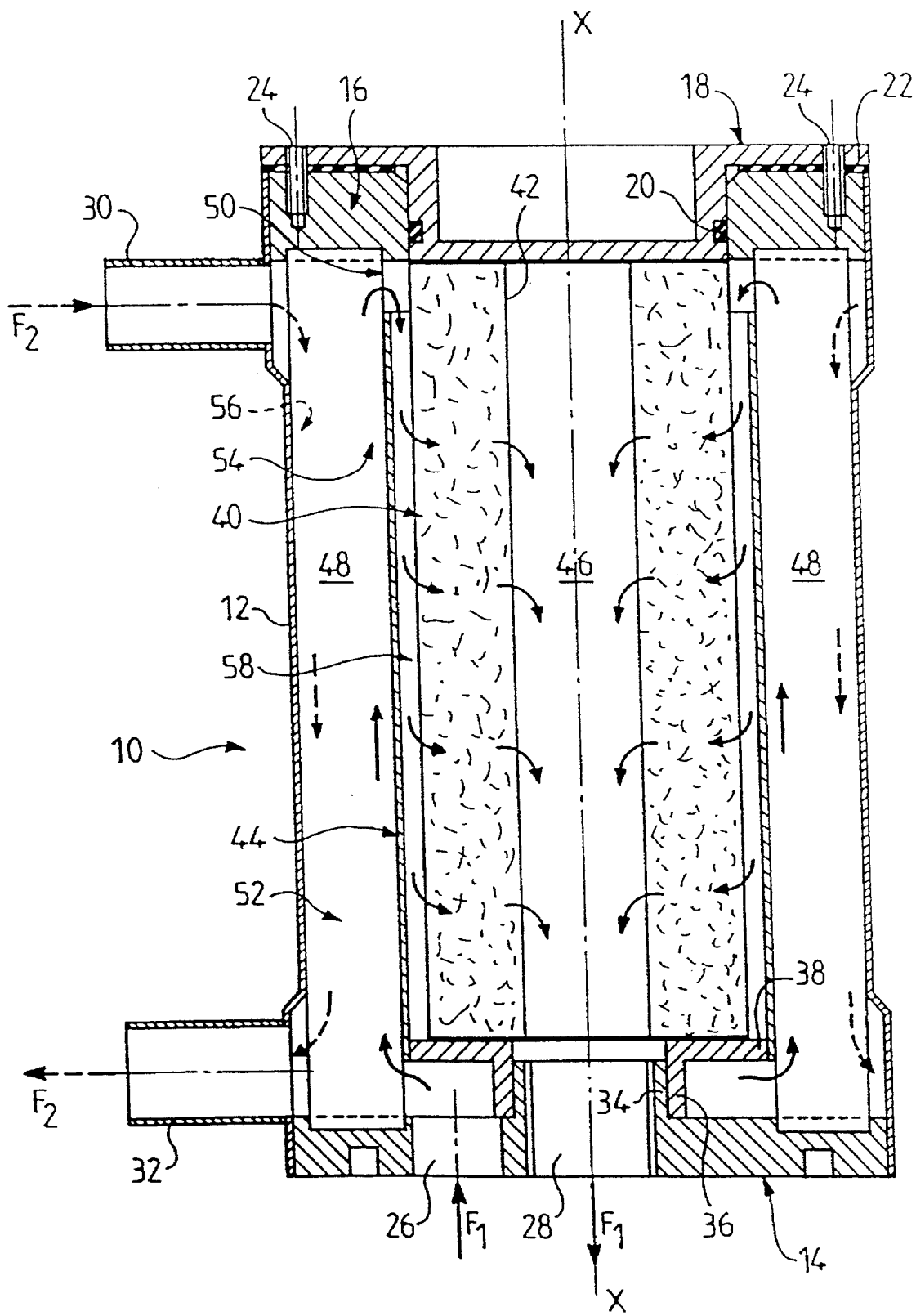
FIG. 1 is a view in cross section of a heat exchanger in a first embodiment of the invention, the plane of the cross section passing through the axis of symmetry of the casing.

The heat exchanger shown in FIG. 1 comprises a casing 10 which is bounded by a cylindrical wall 12 having a symmetry of revolution about an axis XX, together with a first end wall 14 and a second end wall 16, at opposite ends of the wall 12 and therefore at opposite ends of the casing. Both of the end walls 14 and 16 are generally circular in shape. The end wall 16 has the general form of a ring on which a removable cover plate 18 is fitted. An O-ring 20 and a flat annular gasket 22 are interposed between the cover plate 18 and the end wall 16. The cover plate 18 is secured to the wall 16 by means of studs 24.

The first end wall 14 has a first inlet 26 spaced away from the axis XX, and a first outlet 28 which is coaxial with the axis XX. The inlet 26 and the outlet 28 are arranged to enable a first fluid F1 (for example lubricating oil for an engine) to enter the casing 10 at a high temperature through the inlet 26, and to leave the latter through the outlet 28 after having been cooled and filtered.

The heat exchanger also has a second inlet 30 and a second outlet 32, each of which is constituted by a short tube joined to the cylindrical wall 12 of the casing 10. The inlet 30 is arranged at the end of the wall 12 closest to the second end wall 16, while the outlet 32 is arranged at the other end of the wall 12, close to the end wall 14. The inlet 30 and outlet 32 are arranged, respectively, so as to admit a second fluid F2, which may for example be cooling fluid for a heat engine, into the casing 10, and to remove it from the latter.

In FIG. 1, the path of the fluid F1 is shown diagrammatically by continuous arrows, while that of the fluid F2 is indicated by arrows in broken lines.

The end wall 14 has a hollow cylindrical spigot 34 which extends along the axis XX into the interior of the casing 10.

The spigot 34 is closely surrounded by a cylindrical sleeve 36 which is formed integrally with an annular plate 38. A generally tubular filter cartridge 40 extends along the axis XX between the annular plate 38 and the cover plate 18. This cartridge may be removed and replaced after removal of the cover plate 18. It may be made in any appropriate material, for example paper, fibrous matter etc. The cartridge 40 defines within it an internal axial passage 42 which follows the axis XX and is aligned with the first outlet 28 in the end wall 14.

The heat exchanger in FIG. 1 also has a cylindrical partition wall 44 which extends from the first end wall 14, and more particularly from the annular plate 38 attached to the latter through the sleeve 36 and spigot 34. The cylindrical partition wall 44 divides the interior of the casing 10 so as to define a filter compartment 46, lying in the axial region of the casing and containing the filter cartridge 40. The wall 44 also defines a heat exchange compartment 48 of annular configuration, which lies between the partition wall 44 and the outer wall 12 of the casing. As can be seen in FIG. 1, the cylindrical partition wall 44 extends up to the vicinity of the second end wall 16, so as to define a communication passage 50, generally annular in shape, between the heat exchange compartment 48 and the filter compartment 10.

The heat exchange compartment 48 also contains heat exchange means, which in this first embodiment comprise a pleated surface 52 of generally tubular configuration, which extends over the entire length of the casing 10 between the end walls 14 and 16. The heat exchange compartment 48 is thus divided into a first chamber 54 (FIGS. 1 and 3) lying between the pleated surface 52 and the cylindrical partition wall 44, and a second chamber 56 which lies between the pleated surface 52 and the cylindrical outer wall 12 of the casing. This division is best seen in FIG. 3.

Figure 2:
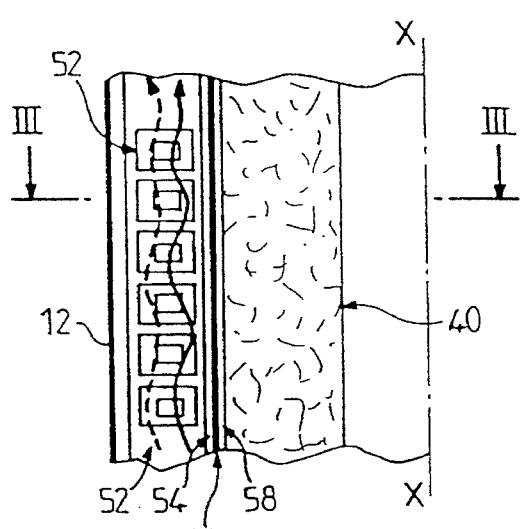
FIG. 2 is a detail of FIG. 1 showing the configuration of the heat exchange means.

The first chamber 54 communicates firstly with the inlet 26, and secondly, via the communication passage 50, with the filter compartment 46. As can be seen in FIGS. 1 to 3, the filter cartridge 40 is spaced away from the cylindrical partition wall 44, so as to leave an annular passage 58 between them, and around the cartridge, for flow of the first fluid. The second chamber 56 is in communication with the inlet 30 and outlet 32 for the second fluid F2.

The apparatus shown in FIGS. 1 to 3 operates in the following way. The fluid F1, for example lubricating oil, enters the casing 10 through the inlet 26, and flows in the first chamber 54, in which it exchanges heat, through the pleated surface 52, with the second fluid F2 which is circulating in the chamber 56 in contraflow to the first fluid. Eventually, the latter leaves the chamber 54 through the annular passage 50, so as to reach the annular passage 58, from whence it passes radially through the filter cartridge 40. It should be noted that the first fluid F1 cannot reach the filter compartment 46 until it has undergone heat exchange with the second fluid F2. After being filtered in the filter cartridge 40, the first fluid F1 reaches the internal passage 42 of the cartridge, and thence passes to the outlet 28.

Figure 3:
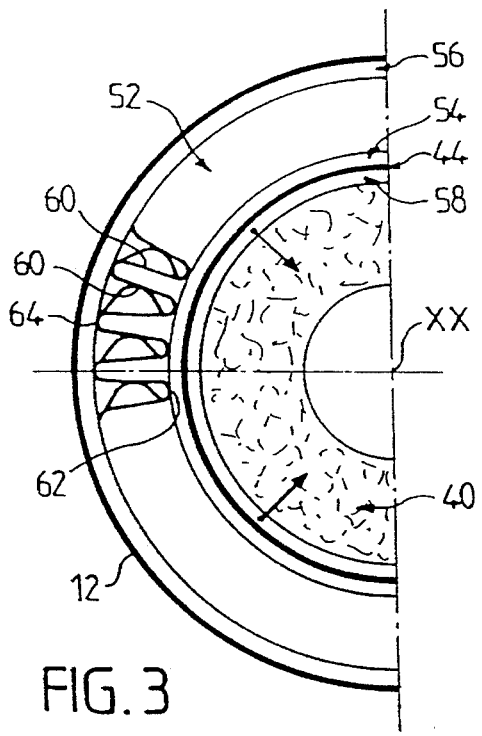
FIG. 3 is a half view in cross section taken on the line III—III in FIG. 2.
Figure 4:
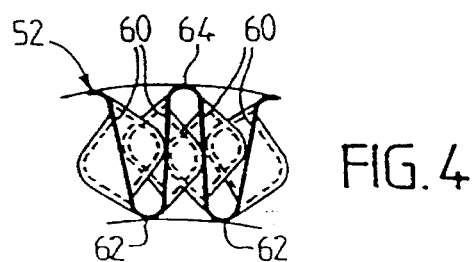
FIG. 4 is a detail of FIG. 3.
Figure 5:
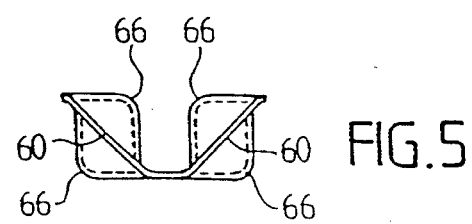
FIG. 5 is a detail of FIG. 4.

In the embodiment in FIGS. 1 to 3, the second fluid F2 accordingly makes contact with the outer peripheral wall 12 of the casing 10. As is best seen in FIGS. 2 and 3, the pleated surface 52 has a tubular configuration, and has a multiplicity of pleats 60 which extend radially with respect to the axis XX of the casing. These pleats are joined together in pairs alternately, on the radially inner side and on the radially outer side, by rounded bends 62 and 64 respectively, shown clearly in FIGS. 3 and 4. Each pleat 60 has pressed-out portions 66 defining bosses and lying on either side of the plane of the pleat. FIG. 5 shows more particularly the structure of these pressed-out portions 66 before the formation of the pleats in the pleated surface 62 has been completed. The presence of the pressed-out portions 66 increases the heat exchange surface available between the fluids F1 and F2, and therefore increases the heat exchange capacity.

It will be understood that the provision of these pressed-out portions is optional, and they are not shown in FIG. 1 in the interests of simplifying the drawing.

Figure 6:
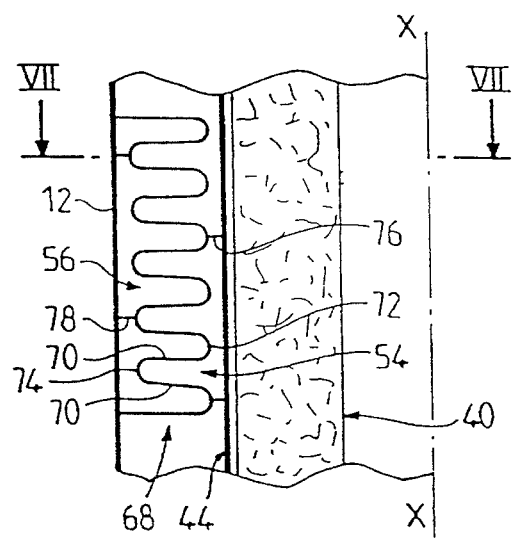
FIG. 6 is a half view in partial cross section of a heat exchanger in a second embodiment of the invention.
Figure 7:
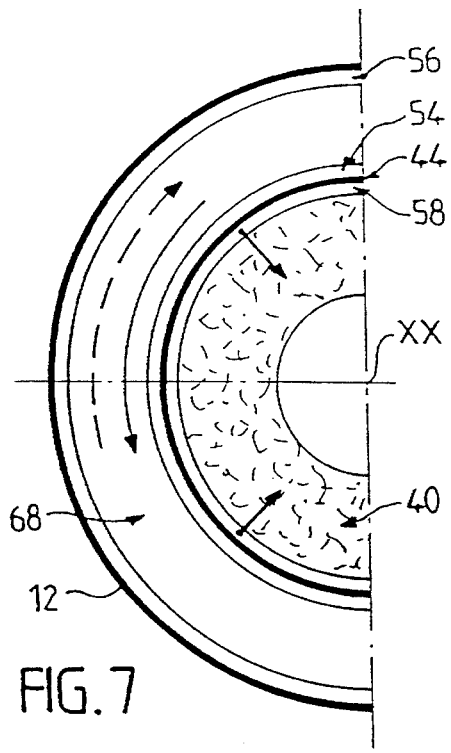
FIG. 7 is a half view in cross section taken on the line VII—VII in FIG. 6.

Reference is now made to FIGS. 6 and 7, showing a second embodiment. Here, the heat exchange means comprise a pleated surface 68 of generally tubular configuration, having a multiplicity of annular pleats 70 extending in planes which are substantially at right angles to the axis XX. The annular pleats 70 are joined together in pairs respectively on the internal side and the external side, through rounded bends 72 and 74. In addition, the heat exchanger is formed with partition elements 76 joining the pleated surface 68 to the cylindrical partition wall 44, and with further partition elements 78 which join the pleated surface to the outer cylindrical wall 12. The chamber 54 is thus defined between the pleated surface 68 and the cylindrical partition wall 44, while the chamber 56 is defined between the pleated surface 68 and the outer cylindrical wall 12. Here again the second fluid is in contact with the cylindrical wall 12.

Figure 8:
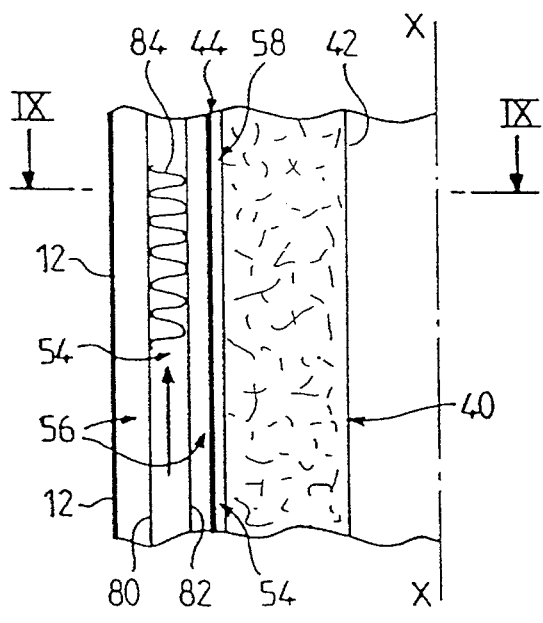
FIG. 8 is a half view in cross section of a heat exchanger in a third embodiment of the invention.
Figure 9:
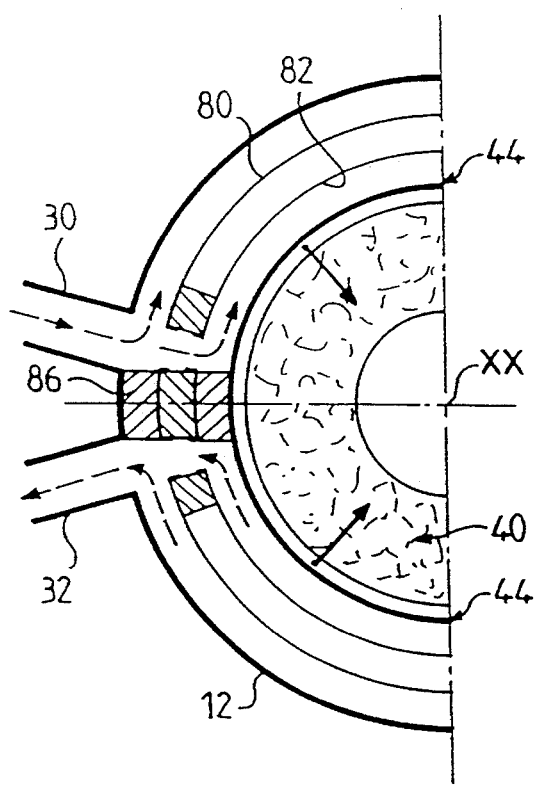
FIG. 9 is a half view in cross section taken on the line IX—IX in FIG. 8.

In the third embodiment shown in FIGS. 8 and 9, the heat exchange means comprise two concentric cylindrical envelopes 80 and 82, which are connected together through perturbating elements 84 for generating turbulence. The first chamber 54, for circulation of the first fluid F1, lies between the two envelopes 80 and 82. The chamber 54 communicates with the annular passage 50 (see FIG. 1) at its end nearest to the end wall 16. The chamber 56, for circulation of the second fluid F2, occupies the annular volume which is defined by the cylindrical wall 12 and the cylindrical partition wall 44, and extends on either side of the two cylindrical envelopes 80 and 82. In this embodiment, the second fluid F2 therefore makes contact, not only with the partition wall 44, but also with the outer wall 12 of the casing.

As can be seen in FIG. 9, a radial partition 86 extends within the chamber 56 between the outer wall 12 and the partition wall 44 so as to prevent the second fluid F2 from passing from the inlet 30 directly to the outlet 32.

Figure 10:
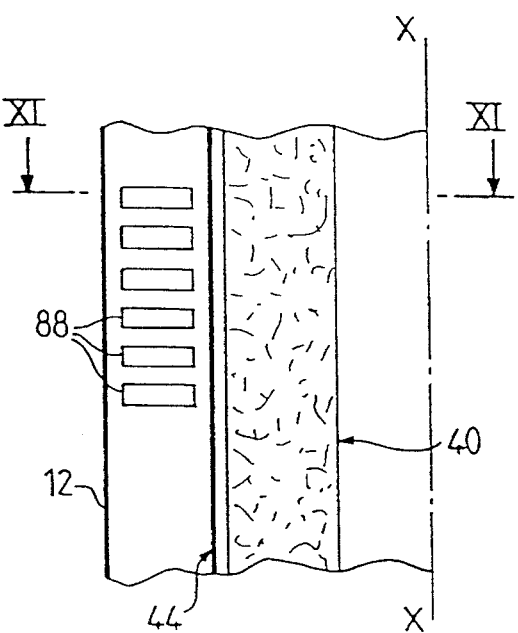
FIG. 10 is a half view in cross section of a heat exchanger in a fourth embodiment of the invention.
Figure 11:
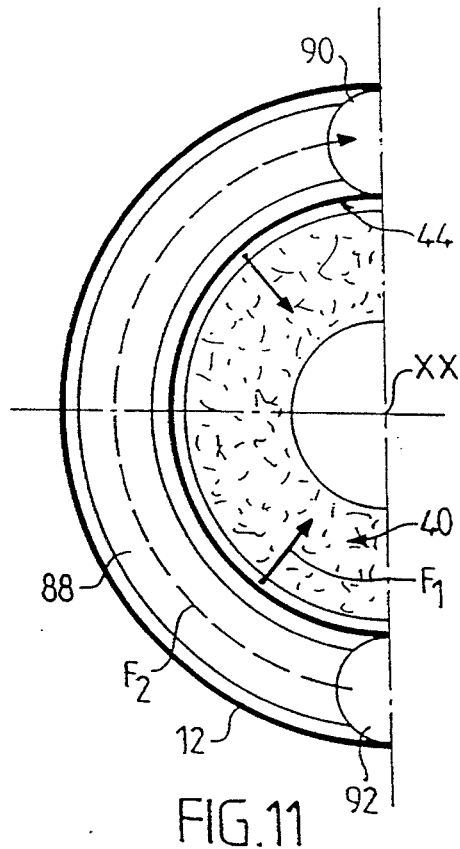
FIG. 11 is a half view in cross section taken on the line XI—XI in FIG. 10.

In the fourth embodiment shown in FIGS. 10 and 11, the heat exchange means comprise a multiplicity of bent, flat tubes 88, which may be electrically welded or extruded, and which can if desired be provided with internal baffles. In this example, these flat tubes have a right rectangular cross section. Each of the tubes 88 is connected to an inlet collector tube 90 and to an outlet collector tube 92. These collector tubes 90 and 92 both extend parallel to the axis of casing, and are arranged in regions which are diametrically opposed with respect to that axis. The tubes 90 and 92 are connected to the inlet 30 and outlet 32, respectively, for flow of the second fluid F2.

In FIGS. 10 and 11, the chamber 54 for flow of the first fluid F1 is thus defined by the cylindrical outer wall 12 of the casing and the cylindrical partition wall 44, so that the first fluid F1 makes contact with the outer wall 12. The chamber 56 for flow of the second fluid is defined by all of the flat tubes 88, together with the collector tubes 90 and 92.

Figure 12:
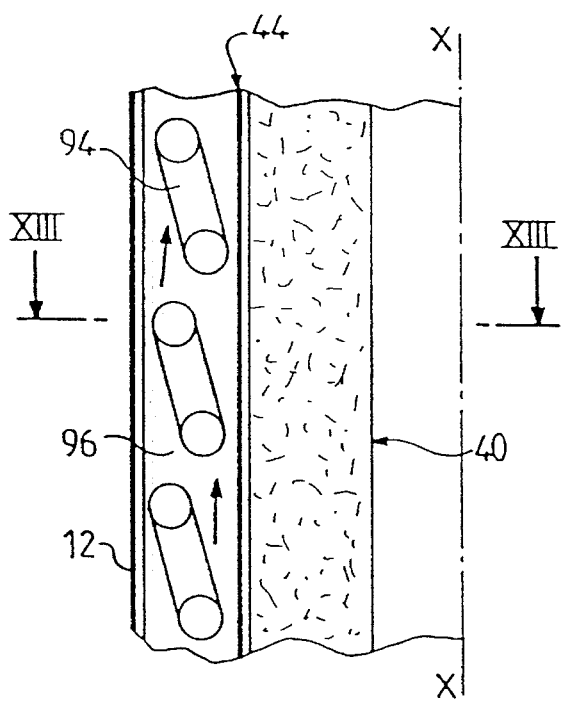
FIG. 12 is a half view in cross section of a heat exchanger in a fifth embodiment of the invention.
Figure 13:
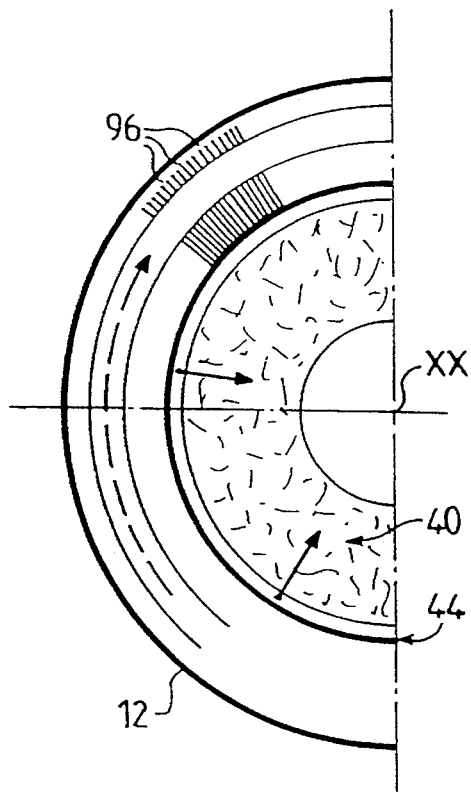
FIG. 13 is a half view in cross section taken on the line XIII—XIII in FIG. 12.

Reference is now made to FIGS. 12 and 13 showing a fifth embodiment of the invention. In this version, the heat exchange means comprise a multiplicity of hairpin shaped round tubes 94, which are bent in an arc of a circle and which are joined together through radial fins 96. As in the embodiment described above with reference to FIGS. 10 and 11, the chamber 54 in which the first fluid F1 flows is defined between the outer cylindrical wall 12 and the cylindrical partition wall 14, while the chamber 56 in which the second fluid F2 flows is defined by the tubes 94. Here again, the first fluid F1 makes contact with the outer cylindrical wall 12 of the casing.

Figure 14:
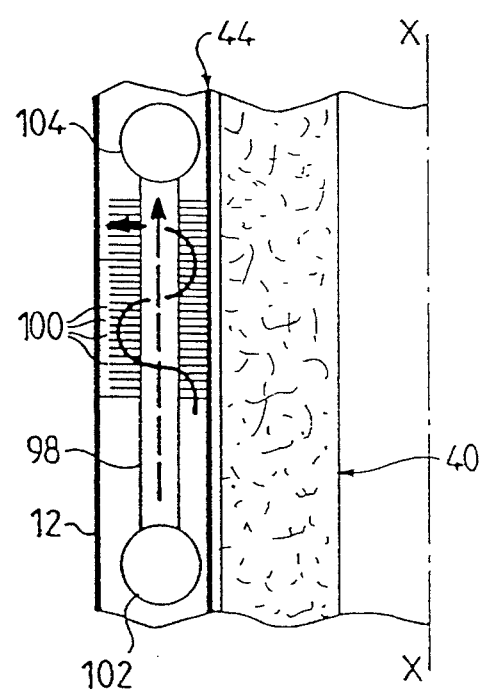
FIG. 14 is a half view in cross section of a heat exchanger in a sixth embodiment of the invention.
Figure 15:
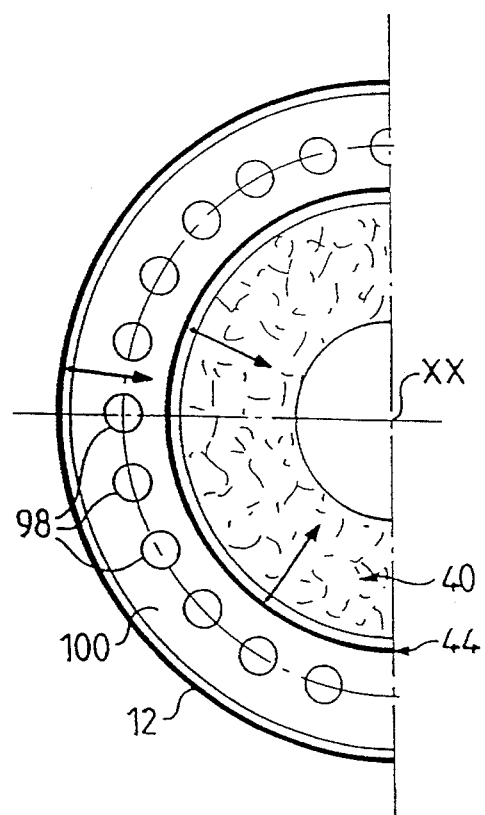
FIG. 15 is a half view in cross section taken on the line XV—XV in FIG. 14.

In the sixth embodiment shown in FIGS. 14 and 15, the heat exchange means comprise a multiplicity of round tubes 98 which extend parallel to the axis XX of the casing and at an equal distance from the latter. A multiplicity of annular fins 100 connect the tubes 98 together, and extend in planes which are at right angles to the axis XX of the casing. The heat exchange means here also includes a toroidal inlet collector 102 and a toroidal outlet collector 104. The collectors 102 and 104 communicate with the inlet 30 and outlet 32, respectively, of the casing 10.

As in the two versions described above with reference to FIGS. 10 to 13, the chamber 54 in which the first fluid F1 flows is defined between the outer cylindrical wall 12 and the internal partition wall 44, so that the first fluid F1 makes contact with the wall 12. The chamber 56 in which the second fluid F2 flows is defined by the interior of all of the round tubes 98 together with the collectors 102 and 104.

It will be understood that the heat exchange means in the various embodiments described above provide an increase in the heat exchange surface, as compared with that obtained by a simple cylindrical bulkhead separating the chambers 54 and 56 as in the prior art.

The invention is not limited to the various embodiments described above, and it extends to other variations. It has a particular application to the cooling and filtration of lubricating oil for heat engines, especially in motor vehicles.

What is claimed is:

1. A heat exchanger and filter unit comprising: a casing defining an axis of the unit and comprising a cylindrical wall symmetrical about the said axis, a first end wall at one end of said cylindrical wall, defining one end of the casing, and a second end wall at the other end of the cylindrical wall, defining the other end of the casing; means defining an axial internal region of the casing and a filter compartment within said axial region; means defining an annular heat exchange compartment within the casing and disposed between the said filter compartment and the cylindrical wall of the casing; a tubular filter cartridge in said filter compartment; heat exchange means arranged in the heat exchange compartment and defining in the latter a first chamber for flow of a first fluid and a second chamber for flow of a second fluid, the heat exchange means comprising a tubular heat exchange body having a multiplicity of pleats extending radially with respect to the axis of the casing and defining a pleated heat exchange surface, so as to define the said first chamber between the pleated surface and the partition wall, and the said second chamber between the pleated surface and the cylindrical wall of the casing; a first fluid inlet and a first fluid outlet on the said first end wall; and a second fluid inlet and a second fluid outlet on the cylindrical wall of the casing, with the said first chamber communicating with the said first inlet and with the filter compartment, the said first outlet communicating with the filter compartment, and the said second inlet and second outlet communicating with the said second chamber, wherein the said unit includes a cylindrical partition wall within the casing, extending axially from the said first end wall to the vicinity of the said second end wall so as to separate the said first chamber from the filter compartment, the said partition wall defining a communication passage between the said first chamber and filter compartment for flow of the said fluid from the former to the latter, the said passage being adjacent to the second end wall.

2. A heat exchanger according to claim 1, wherein the filter cartridge is disposed coaxially inside the cylindrical partition wall and defines an annular passage between itself and the partition wall for flow of the said first fluid received from the said communication passage, whereby the fluid can pass from the said annular passage radially through the filter cartridge.

3. A heat exchanger according to claim 1, wherein the pleated heat exchange body further includes rounded bends joining the pleats together in pairs, alternately on the inner and outer radial sides of the body, each pleat defining pressed-out portions in the form of bosses.

4. A heat exchanger according to claim 1, further including a cover plate removably fitted over the second end wall of the casing so as to give access to the tubular filter cartridge for replacement of the latter.

* * * * *